US010329166B2

(12) United States Patent
Mizutani et al.

(10) Patent No.: US 10,329,166 B2
(45) Date of Patent: Jun. 25, 2019

(54) EVAPORATIVE TREATMENT METHOD FOR AQUEOUS SOLUTION

(71) Applicant: SASAKURA ENGINEERING CO., LTD., Osaka-shi (JP)

(72) Inventors: Junji Mizutani, Osaka (JP); Yo Fujimoto, Osaka (JP); Tatsuya Taguchi, Osaka (JP); Yoshiyuki Hatano, Osaka (JP)

(73) Assignee: SASAKURA ENGINEERING CO., LTD., Osaka-Shi (JP)

( * ) Notice: Subject to any disclaimer, the term of this patent is extended or adjusted under 35 U.S.C. 154(b) by 746 days.

(21) Appl. No.: 14/242,393

(22) Filed: Apr. 1, 2014

(65) Prior Publication Data

US 2014/0299461 A1    Oct. 9, 2014

(30) Foreign Application Priority Data

Apr. 5, 2013  (JP) .................................. 2013-79547
Oct. 16, 2013  (JP) ................................ 2013-215237

(51) Int. Cl.
*B01D 1/16* (2006.01)
*B01D 1/18* (2006.01)
(Continued)

(52) U.S. Cl.
CPC ............... *C02F 1/042* (2013.01); *B01D 1/04* (2013.01); *B01D 1/16* (2013.01); *B01D 1/18* (2013.01);
(Continued)

(58) Field of Classification Search
CPC .. B01D 9/0036; B01D 9/0018; B01D 9/0022; B01D 9/0027; B01D 9/0031; B01D 1/02;
(Continued)

(56) References Cited

U.S. PATENT DOCUMENTS 3,932,224 A * 1/1976 Hirota .................... C02F 1/042
                                            159/DIG. 13
4,188,291 A * 2/1980 Anderson ............ B01D 61/025
                                                    203/10
(Continued)

FOREIGN PATENT DOCUMENTS

CN          85103681 A     11/1986
JP         S49-109267 A    10/1974
(Continued)

OTHER PUBLICATIONS

Chyu, Ming-Chien, "Falling film evaporation on horizontal tubes with smooth and structured surfaces" (1984). Retrospective Theses and Dissertations. 8154. Available online at: http://lib.dr.iastate.edu/rtd/8154/?utm_source=lib.dr.iastate.edu%2Frtd%2F8154&utm_medium=PDF&utm_campaign=PDFCoverPages.*

(Continued)

*Primary Examiner* — Jonathan Miller
*Assistant Examiner* — Jonathan Luke Pilcher
(74) *Attorney, Agent, or Firm* — Sterne, Kessler, Goldstein & Fox P.L.L.C.

(57) ABSTRACT

The present invention provides an aqueous solution evaporative treatment method that makes it possible to efficiently perform evaporative treatment of an aqueous solution containing calcium, magnesium, and silica. The aqueous solution evaporative treatment method comprises a seed crystal mixing step of adding to and mixing with an aqueous solution containing calcium, magnesium, and silica at least any one of magnesium salt and silicate together with calcium salt as seed crystals, and an evaporative concentration step of evaporatively concentrating the aqueous solution together with the seed crystals.

9 Claims, 2 Drawing Sheets

(51) Int. Cl.
*B01D 1/04* (2006.01)
*B01D 9/00* (2006.01)
*C02F 1/52* (2006.01)
*C02F 1/04* (2006.01)
*C02F 1/44* (2006.01)

(52) U.S. Cl.
CPC .......... *B01D 9/0018* (2013.01); *B01D 9/0027* (2013.01); *B01D 9/0031* (2013.01); *B01D 9/0036* (2013.01); *C02F 1/441* (2013.01); *C02F 2001/5218* (2013.01); *Y02W 10/37* (2015.05)

(58) Field of Classification Search
CPC . B01D 1/04; B01D 1/06; B01D 1/065; B01D 1/08; B01D 1/10; B01D 1/12; B01D 1/16; B01D 1/18; B01D 1/20; C02F 2001/5218
USPC .................................................. 159/13.1, 13.3
See application file for complete search history.

(56) References Cited

U.S. PATENT DOCUMENTS

| | | | |
|---|---|---|---|
| 4,765,913 A | 8/1988 | Featherstone | |
| 5,156,706 A | 10/1992 | Sephton | |
| 6,761,865 B1* | 7/2004 | Gallup | C01B 33/22 210/696 |
| 9,120,685 B2* | 9/2015 | Bjorklund | B01D 1/065 |
| 2009/0294377 A1* | 12/2009 | Gallot | B01D 1/0047 210/737 |
| 2010/0038081 A1 | 2/2010 | Gamache et al. | |
| 2012/0006671 A1 | 1/2012 | Nowak | |
| 2012/0145386 A1* | 6/2012 | Bjorklund | B01D 1/065 166/266 |
| 2015/0321924 A1 | 11/2015 | Wrubel | |

FOREIGN PATENT DOCUMENTS

| | | |
|---|---|---|
| JP | S50-15797 A | 2/1975 |
| JP | S60-46920 A | 3/1985 |
| JP | S61-42390 A | 2/1986 |
| JP | H07-24475 A | 1/1995 |
| JP | H08-276191 A | 10/1996 |
| JP | H10-118694 A | 5/1998 |
| JP | 2000-126755 A | 5/2000 |
| JP | 2000159654 A | 6/2000 |
| JP | 2001-047032 A | 2/2001 |
| JP | 2001-092863 A | 4/2001 |
| JP | 2003-172593 A | 6/2003 |
| JP | 2006-305541 | 11/2006 |
| JP | 2012-148210 A | 8/2012 |
| WO | WO 2012/008013 A1 | 1/2012 |
| WO | WO 2012/088240 A2 | 6/2012 |

OTHER PUBLICATIONS

Office Action issued in Japanese Patent Application No. 2013-215237 dated May 26, 2017.
Examination Report issued in Australian Patent Application No. 2014202849, dated Mar. 9, 2018, 6 pages.
Examination Report issued in Australian Patent Application No. 2014201764, dated Apr. 11, 2018, 7 pages.

* cited by examiner

EVAPORATIVE TREATMENT METHOD FOR AQUEOUS SOLUTION

BACKGROUND OF THE INVENTION

1. Field of the Invention

The present invention relates to an evaporative treatment method for an aqueous solution, and more specifically, relates to an aqueous solution evaporative treatment method in which an aqueous solution containing calcium, magnesium, and silica is evaporated by indirect heating.

2. Description of the Related Art

When evaporating an aqueous solution containing impurities such as calcium by indirect heating, scale builds up on the heat transfer surface of a heat exchanger, and the heat transfer coefficient is likely to deteriorate. Accordingly, to date, measures to address this phenomenon have been investigated. For example, Patent Document 1 discloses a waste water treatment method in which sodium carbonate is added to waste water containing calcium and sulfuric acid to precipitate the calcium contained in the waste water as crystals of calcium carbonate, and then the waste water is concentrated through boiling/evaporation by indirect heating.

Patent Document 1: JP-A 2006-305541

BRIEF SUMMARY OF THE INVENTION

Although the aforementioned waste water treatment method is effective when the impurity contained in waste water is calcium, there is still a concern that scale buildup on the heat transfer surface becomes problematic when magnesium and silica other than calcium are contained. Accordingly, a complex process for removing magnesium and silica is separately required, resulting in an increase in treatment cost.

Therefore, an object of the present invention is to provide an aqueous solution evaporative treatment method that makes it possible to efficiently perform evaporative treatment of an aqueous solution containing calcium, magnesium, and silica.

The foregoing object of the present invention is achieved by an evaporative treatment method for an aqueous solution, comprising a seed crystal mixing step of adding to and mixing with an aqueous solution containing calcium, magnesium, and silica at least any one of magnesium salt and silicate together with calcium salt as seed crystals, and an evaporative concentration step of evaporatively concentrating the aqueous solution together with the seed crystals.

It is preferable for this aqueous solution evaporative treatment method that the seed crystals contained in a concentrated liquid produced in the evaporative concentration step are used in the next seed crystal mixing step.

The seed crystals can contain crystals of magnesium silicate as the magnesium salt as well as the silicate. Also, the seed crystals can contain crystals of calcium carbonate as the calcium salt.

In the seed crystal mixing step, it is possible that magnesium salt that is highly soluble in an aqueous solution containing calcium and silica is added to produce the aqueous solution containing calcium, magnesium, and silica, and then the seed crystals are added. That is to say, it is preferable that when there is a shortage of salt ions that produce the silicate, soluble salts that supplement such salt ions are added.

Moreover, it is preferable that the method further comprises a pretreatment step of concentrating the aqueous solution using a reverse osmosis membrane, which is performed before the seed crystal mixing step.

According to the present invention, an aqueous solution evaporative treatment method that makes it possible to efficiently perform evaporative treatment of an aqueous solution containing calcium, magnesium, and silica can be provided.

BRIEF DESCRIPTION OF THE DRAWINGS/FIGURES

DETAILED DESCRIPTION OF THE INVENTION

Figure 1:
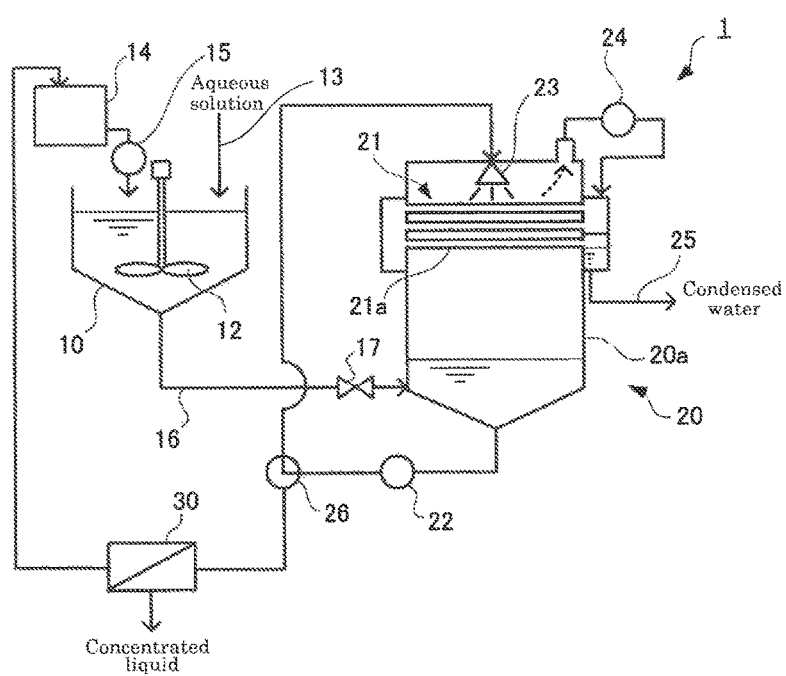
FIG. 1 is a schematic configurational diagram of an evaporative treatment apparatus used for an aqueous solution evaporative treatment method according to one embodiment of the present invention.

Below, one embodiment of the present invention will now be described with reference to the attached drawings. FIG. 1 is a schematic configurational diagram of an evaporative treatment apparatus used for an aqueous solution evaporative treatment method according to one embodiment of the present invention. As shown in FIG. 1, an evaporative treatment apparatus 1 includes a reservoir tank 10 in which an aqueous solution to be treated is stored and an evaporative concentration device 20 to which the aqueous solution is supplied from the reservoir tank 10.

The reservoir tank 10 includes a stirrer 12, and an aqueous solution supplied from an aqueous solution supply line 13 and seed crystals supplied from a seed crystal tank 14 by the operation of an injection pump 15 are uniformly mixed inside the reservoir tank 10.

The evaporative concentration device 20 is a falling film type in which the fluid evaporates on the outer surface of a tube, and includes a heat exchanger 21 that has heat exchanger tubes 21a horizontally positioned in an evaporator 20a and a spraying nozzle 23 that sprays an aqueous solution onto the surface of the heat exchanger tubes 21a. Steam produced in the evaporator 20a is compressed by a compressor 24 to have high temperature and high pressure, introduced into the heat exchanger tubes 21a to be used for heating the aqueous solution, and then discharged as condensed water from a condensed liquid discharge tube 25. The aqueous solution stored in the bottom of the evaporator 20a is repeatedly sprayed from the spraying nozzle 23 by the operation of a circulating pump 22. The concentrated liquid concentrated in the evaporator 20a is introduced into a solid-liquid separator 30 by the operation of a switching valve 26, and seed crystals are thus separated and discharged to the outside. The separated seed crystals are returned to the seed crystal tank 14 and reused. The solid-liquid separator 30 can be, for example, a centrifugation type, a filter type, or a sedimentation type, or may be a combination of such types.

The configuration of the evaporative concentration device 20 is not particularly limited, and, for example, the heat exchanger tubes 21a may be a vertical type instead of a horizontal type. Moreover, for the heating medium that travels inside the heat exchanger tubes 21a, a separate heating medium may be introduced from outside instead of using a heating medium obtained by mechanical vapor recompression as in this embodiment. Also, the evaporative concentration device 20 can be configured to be a multiple-stage type by arranging the evaporator 20*a* as a multi-effect evaporator as necessary.

Next, a method for performing evaporative treatment of an aqueous solution using the above-described evaporative treatment apparatus 1 will now be described. An aqueous solution supplied from the aqueous solution supply line 13 to the reservoir tank 10 is not particularly limited as long as it contains calcium, magnesium, and silica, and examples include, in addition to waste liquids generated in factories and similar facilities, contaminated water generated during mining of natural gas such as coal seam gas and shale gas, underground hot water used for geothermal power generation, and the like. The concentrations of calcium, magnesium, and silica are also not particularly limited, but the method is particularly effective when there are such concentrations that scale buildup in the evaporative concentration device 20 is problematic. For example, the silica concentration of the aqueous solution supplied to the reservoir tank 10 is preferably 50 ppm or higher. This is because, in evaporative concentration, the aqueous solution is usually concentrated about 4 to 10 fold, and, therefore, even when the silica concentration is 50 ppm, the concentration reaches 200 to 500 ppm in the evaporative concentration device 20, possibly posing silica scale problems. The calcium and magnesium concentrations in the aqueous solution are preferably higher than, for example, 10 ppm.

Seed crystals accommodated in the seed crystal tank 14 are crystals of salts containing calcium, magnesium, and silica (calcium salt, magnesium salt, and silicate) that are components of the aqueous solution. If the components of scale that will build up on the heat exchanger 21 or the like in the evaporative concentration device 20 are apparent beforehand, it is preferable to use, as seed crystals, crystals of the same compounds as the aforementioned components, but the seed crystals do not necessarily have to be of the same compounds as the scale components as long as they are compounds containing calcium, magnesium, and silica. Seed crystals in a particle form are usable as-is, or those in a slurry form in which crystals are dispersed in water or the like are usable as well.

The calcium salt, magnesium salt, and silicate that serve as seed crystals may be compounds different from each other, or some or all may be the same compound. In this embodiment, calcium carbonate serves as the calcium salt, and magnesium silicate serves as the magnesium salt as well as the silicate. Seed crystals containing calcium carbonate and magnesium silicate are for using, as seed crystals, the same compounds as compounds that may become scale components when treating the aqueous solution generated during mining of coal seam gas, shale gas, etc., and are therefore particularly suitable for this application.

Magnesium and silica contained in the aqueous solution readily bind to each other and readily become scale components in the form of silica magnesium or the like, and it is preferable that magnesium silicate $(MgO)n.(SiO_2)m)$ is contained as seed crystals as stated above, but each may be a separate compound such as a magnesium salt and a silicate. Examples of the magnesium salt include magnesium oxide, magnesium hydroxide, magnesium carbonate, magnesium sulfate, and a combination of two or more of these. Examples of the silicate include calcium silicate, calcium magnesium silicate, and the like, and, furthermore, when metal ions or the like other than calcium, magnesium, and silica are contained in the aqueous solution, the silicate may be a compound formed with such ions (such as aluminum silicate or calcium aluminum silicate). Furthermore, it is not necessary that the magnesium salt and the silicate that serve as seed crystals have to be contained both at the same time, and it is possible to use either one independently. For example, when silica is contained in large amounts in an aqueous solution, silicate seed crystals are not necessarily needed, and addition of magnesium oxide as seed crystals makes it possible to grow magnesium silicate crystals by taking advantage of silica in the aqueous solution.

It is preferable that the calcium salt that serves as seed crystals is suitably determined in consideration of the components contained in the aqueous solution. For example, when the amount of carbonate ion components contained in the aqueous solution is small and the amount of sulfate ions contained therein is large, it is preferable to use calcium sulfate in place of calcium carbonate as seed crystals. Examples of other calcium salts include calcium oxide, calcium hydroxide, calcium silicate, and a combination of two or more of these.

In the reservoir tank 10, seed crystals are added to an aqueous solution and uniformly stirred, and thus the seed crystals, serving as nuclei, allow calcium, magnesium, and silica compounds contained in the aqueous solution to undergo crystal growth. The amount of seed crystals supplied from the seed crystal tank 14 to the reservoir tank 10 is preferably an amount sufficient for promoting seed crystal growth without impairing the flowability of the aqueous solution. In the reservoir tank 10, the pH may be adjusted by suitably adding a pH adjuster. The present invention aims to make scale components grow into seed crystals, and therefore, for example, in the case where only the silica concentration in an aqueous solution greatly exceeds the degree of solubility whereas the magnesium concentration is nearly zero, it is preferable to add a soluble magnesium salt (such as magnesium chloride) that is different from seed crystals to the aqueous solution in order to attain an appropriate magnesium ion concentration. The amount of the magnesium salt may be about equimolar to silica. Due to such an operation, it is possible, when magnesium silicate is added as seed crystals, to make silica originally contained in an aqueous solution grow into crystals of magnesium silicate together with the added magnesium, and it is possible to effectively prevent generation of silica scale in the evaporative concentration device 20 at the latter stage.

Thereafter, opening the supply valve 17 allows the aqueous solution to be supplied from the reservoir tank 10 to the evaporative concentration device 20, and evaporative concentration of the seed crystal-containing aqueous solution is performed. In the aqueous solution to be supplied to the evaporative concentration device 20, compounds of calcium, magnesium, and silica that are scale components undergo crystal growth in the reservoir tank 10, with seed crystals serving as nuclei. Therefore, even when the concentration of scale components is increased due to the evaporative concentration of the aqueous solution in the evaporative concentration device 20 and exceeds the scale production threshold, due to the precipitation of scale components with the existing seed crystals serving as nuclei, generation of new nuclei is suppressed, and it is thus possible to prevent scale buildup on the heat exchanger 21.

A concentrated liquid concentrated in the evaporative concentration device 20 is introduced into the solid-liquid separator 30 due to the operation of the switching valve 26. In the solid-liquid separator 30, seed crystals with a large particle size that have undergone crystal growth are separated by centrifugation or precipitation in a settling tank and, after impurity removal by washing or the like, are supplied to the seed crystal tank 14. Therefore, even in the case where large amounts of seed crystals are supplied to the reservoir tank 10, most of the seed crystals are recovered and can be used for the next seed crystal growth in the reservoir tank 10, and it is thus possible to achieve high economical efficiency.

Although it is also possible to continuously supply the aqueous solution from the reservoir tank 10 to the evaporative concentration device 20 while the evaporative concentration device 20 is in operation, it is preferable to supply the aqueous solution in a batch-wise manner in which the aqueous solution is supplied after the concentrated liquid produced in the evaporative concentration device 20 is completely discharged to the outside. Moreover, it is preferable that after seed crystals are added to the reservoir tank 10, the aqueous solution is stirred and left to stand still until seed crystal growth in the reservoir tank 10 terminates, and then supplied to the evaporative concentration device 20 to initiate evaporative concentration. It is thereby possible to grow crystals on seed crystals in the evaporative concentration device 20, and to more reliably prevent scale buildup on the heat exchanger 21 and the like.

Figure 2:
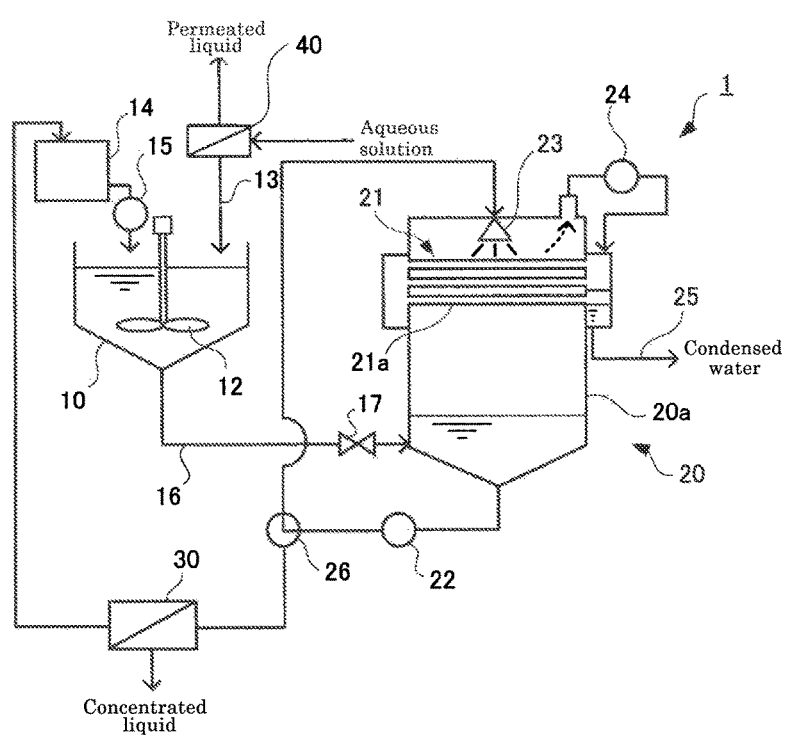
FIG. 2 is a schematic configurational diagram of an evaporative treatment apparatus used for an aqueous solution evaporative treatment method according to another embodiment of the present invention.

As shown in FIG. 2, a pretreatment device 40 for concentrating beforehand the aqueous solution to be supplied to the reservoir tank 10 may be provided on the upstream side of the reservoir tank 10 to supply brine (concentrated liquid) of the pretreatment device 40 to the reservoir tank 10. The pretreatment device 40 is not particularly limited, and examples include an RO (reverse osmosis membrane) treatment device, an ion exchange treatment device, a combination of such devices, and the like. In FIG. 2, the same components as in FIG. 1 are given the same reference numbers.

The use of an ion exchange treatment device as the pretreatment device 40 requires a regenerant for regeneration of a resin, and especially when the aqueous solution contains considerable Na ions, a large amount of regenerant is discharged, and treatment in which a solar pond or the like is used becomes troublesome. Therefore, it is preferable to not perform ion exchange treatment but perform only RO treatment when liquid disposal can be problematic.

When performing RO treatment, acid may be injected for pH control in order to prevent scale problems of a membrane as in an ordinary seawater desalination process. However, when considerable carbonate ions are contained in the aqueous solution, the acid injection method is not suitable, and, therefore, it is preferable in this case to set the recovery rate of the membrane (flow rate of permeated liquid/flow rate of aqueous solution) at such a small value (for example, 80% or less) that scale problems of the membrane can be prevented. The recovery rate of the membrane can be set at a desired value by suitably controlling the flow rate of blowdown of the pretreatment device 40 where RO treatment is performed.

The evaporative treatment apparatus 1 of this embodiment can effectively prevent scale buildup on the heat exchanger tubes in the evaporative concentration device 20 by adding seed crystals to the reservoir tank 10, and therefore a high recovery rate is not particularly required of the pretreatment device 40. That is, a combination of RO treatment and evaporative concentration treatment that is performed after seed crystal mixing makes it possible to more efficiently perform evaporative treatment of an aqueous solution without deterioration of the ability of RO treatment caused by scale problems.

When sodium carbonate, NaCl, and the like are contained in the aqueous solution, it is preferable to set the concentration rate of the evaporative concentration device 20 to such an extent that these salts do not precipitate in the evaporative concentration device 20. When sodium carbonate, NaCl, and the like in the aqueous solution are recovered, it is possible that the aqueous solution that has traveled through the solid-liquid separator 30 is evaporatively concentrated to remove sodium carbonate crystals and then the aqueous solution is further evaporatively concentrated to remove crystals of NaCl and the like.

Example 1

As Example 1, an evaporative treatment apparatus 1 having the same configuration as FIG. 1 was used to perform treatment on an aqueous solution composed of simulated liquid coal seam gas having the components shown in Table 1 below. Two types of seed crystals, i.e., $CaCO_3$ and $(MgO)$.$3(SiO_2)$, were used each in an amount of 2 $kg/m^3$. Seed crystals were added to the aqueous solution in a reservoir tank 10 and constantly stirred to thus form a uniform slurry, and the slurry was supplied to an evaporative concentration device 20 to perform evaporative concentration. In the evaporative concentration device 20, 126 heat exchanger tubes 21a each having an outer diameter of 19 mm and a length of 460 mm were used. In the evaporative concentration device 20, the evaporation temperature was 72° C., the evaporation amount was 38 kg/h, the concentration rate was 11 fold, and the duration of operation was 28 days. Then, there was no scale buildup on the heat exchanger tubes 21a, and deterioration of heat transfer coefficient was not observed.

TABLE 1

| Na | Ca | Mg | Cl | K | $HCO_3$ | $CO_3$ | $SiO_2$ |
|---|---|---|---|---|---|---|---|
| 18,000 | 80 | 38 | 12,000 | 110 | $6,000 \times 10^3$ | 1,900 | 78 |

(mg/L)

Comparative Example 1

On the other hand, as Comparative Example 1, evaporative concentration was performed on an aqueous solution under the same conditions as in Example 1 except that only $CaCO_3$ was used as seed crystals in an amount of 2 $kg/m^3$. Then, scale buildup on the heat exchanger tubes 21a was observed 14 days after the beginning of operation, and the heat transfer coefficient decreased to 80% of the value obtained immediately after the beginning of operation. It was not possible to remove the built-up scale by acid cleaning alone, and alkali cleaning was necessary, thus suggesting the possibility of silica magnesium scale.

Example 2

As Example 2, an evaporative treatment apparatus 1 having the same configuration as FIG. 2 was used to perform treatment on an aqueous solution composed of simulated liquid coal seam gas having the components shown in Table 2 below. An RO treatment device ("SW30HR" manufactured by Dow Chemical Company) was used for a pretreatment device 40, and the recovery rate of the aqueous solution supplied at 10000 $m^3$/day to the pretreatment device 40 was set at 80% (i.e., the amount of brine supplied to an reservoir tank 10 was 2000 $m^3$/day). Moreover, the concentration rate in the evaporative concentration device 20 was set at 9.5 fold, being near the limit at which precipitation of sodium carbonate crystals does not occur (i.e., the amount of blowdown was 2000 (m³/day)/9.5=210 (m³/day)). Other conditions were the same as in Example 1. The test revealed that there was no scale buildup on the heat exchanger tubes 21a, and deterioration of heat transfer coefficient was not observed.

TABLE 2

| Na | Ca | Mg | Cl | K | HCO₃ | CO₃ | SiO₂ |
|---|---|---|---|---|---|---|---|
| 2,500 | 12 | 10 | 3,000 | 15 | 860 | 350 | 22 |

(mg/L)

Comparative Example 2

On the other hand, as Comparative Example 2, a test was carried out using for the pretreatment device 40 an ion exchange treatment device (WK40, weakly acidic cationic resin manufactured by Mitsubishi Chemical Corporation) and an RO treatment device as used in Example 1 without adding seed crystals to the reservoir tank 10. Since the formulation of the aqueous solution is the same as in Example 2 (Table 2) and it is possible to remove Ca and Mg by the ion exchange treatment device, the recovery rate of the RO treatment device was set at 90%, which is higher than that in Example 2 (i.e., the amount of brine supplied to the reservoir tank 10 was 1000 m³/day). Moreover, the concentration rate in the evaporative concentration device 20 was set at 4.75 fold at which the amount of blowdown was identical to Example 2. In order to prevent scale problems in the RO treatment device, a silica scale inhibitor was used in an amount of 10 mg per liter of the aqueous solution. Other conditions were the same as Example 2, and the test revealed that neither Ca nor Mg scale buildup on the heat exchanger tubes 21a was observed, but there was slight silica scale buildup. Moreover, other than the blowdown (210 m³/day), a regenerant of the ion exchange treatment device was generated as a waste liquid (32.5 m³/day), resulting in a waste liquid increase.

1 Evaporative treatment apparatus
10 Storage tank
14 Seed crystal tank
20 Evaporative concentration device
21 Heat exchanger
21a Heat exchanger tube
30 Solid-liquid separator
40 Pretreatment device

What is claimed is:

1. A method of treating an aqueous solution, comprising:
    adding seed crystals comprising a calcium salt and at least one of a magnesium salt or silicate to an aqueous solution comprising calcium, magnesium, and silica;
    mixing the seed crystals with the aqueous solution comprising calcium, magnesium, and silica;
    supplying the aqueous solution comprising calcium, magnesium, and silica that has been mixed with the seed crystals to an evaporative concentration device comprising a heat exchanger having a plurality of heat exchanger tubes, wherein the plurality of heat exchanger tubes are horizontally positioned; and
    evaporatively concentrating the aqueous solution comprising calcium, magnesium and silica together with the seed crystals to form a concentrated liquid,
    wherein the aqueous solution before the seed crystals are added has a silica concentration of between 20 ppm and 125 ppm, and
    wherein the step of evaporatively concentrating the aqueous solution is performed until the silica concentration of the aqueous solution reaches 200 to 500 ppm.

2. The method of treating an aqueous solution according to claim 1, wherein the seed crystals contained in the concentrated liquid are used in a subsequent addition of seed crystals.

3. The method of treating an aqueous solution according to claim 1, wherein the seed crystals contain crystals of magnesium silicate.

4. The method of treating an aqueous solution according to claim 1, wherein the seed crystals contain crystals of calcium carbonate.

5. The method of treating an aqueous solution according to claim 1, further comprising concentrating the aqueous solution comprising calcium, magnesium, and silica using a reverse osmosis membrane, before adding the seed crystals.

6. The method of treating an aqueous solution according to claim 1, further comprising retaining the aqueous solution in a reservoir tank disposed upstream of the evaporative concentration device for a period of time sufficient to allow the growth of the seed crystals to terminate.

7. The method of treating an aqueous solution according to claim 1, wherein the aqueous solution is supplied to the evaporative concentration device in a batch-wise manner comprising supplying a new batch of aqueous solution after a previous batch of aqueous solution is discharged from the evaporative concentration device.

8. The method of treating an aqueous solution according to claim 1, wherein the seed crystals contain a calcium salt, a magnesium salt, and a silicate.

9. The method of treating an aqueous solution according to claim 1, further comprising:
    selecting one or more compounds for use as seed crystals from a group of compounds found in the aqueous solution that would otherwise cause scale to form on the evaporative concentration device.

* * * * *